(12) United States Patent
Fujimura (10) Patent No.: US 7,918,652 B2
(45) Date of Patent: Apr. 5, 2011

(54) DOVETAIL STRUCTURE OF FAN

(75) Inventor: Tesuji Fujimura, Tokyo (JP)

(73) Assignee: Ishikawajima-Harima Heavy Industries Co. Ltd., Tokyo (JP)

( * ) Notice: Subject to any disclaimer, the term of this patent is extended or adjusted under 35 U.S.C. 154(b) by 1072 days.

(21) Appl. No.: 11/679,985

(22) Filed: Feb. 28, 2007

(65) Prior Publication Data

US 2007/0217914 A1  Sep. 20, 2007

(30) Foreign Application Priority Data

Mar. 14, 2006  (JP) ................. 2006-068518

(51) Int. Cl.
  *F01D 5/30* (2006.01)
  *F04D 29/34* (2006.01)
(52) U.S. Cl. .................................. 416/219 R
(58) Field of Classification Search .............. 416/219 R, 416/220 R, 204 A, 248
  See application file for complete search history.

(56) References Cited

U.S. PATENT DOCUMENTS

| 4,405,285 | A | | 9/1983 | Surdi | |
|---|---|---|---|---|---|
| 4,451,205 | A | * | 5/1984 | Honda et al. ............... | 416/219 R |
| 4,527,952 | A | | 7/1985 | Forestier et al. | |
| 4,604,033 | A | | 8/1986 | Surdi | |
| 4,621,979 | A | * | 11/1986 | Zipps et al. ............... | 416/219 R |
| 5,022,822 | A | * | 6/1991 | Sincere ..................... | 416/219 R |
| 5,067,876 | A | * | 11/1991 | Moreman, III ............ | 416/219 R |
| 5,112,193 | A | * | 5/1992 | Greer et al. ............... | 416/220 R |
| 5,281,096 | A | | 1/1994 | Harris et al. | |
| 5,443,365 | A | * | 8/1995 | Ingling et al. ............. | 416/193 A |
| 5,486,095 | A | | 1/1996 | Rhoda et al. | |
| 5,624,233 | A | * | 4/1997 | King et al. ................. | 416/219 R |
| 5,913,660 | A | * | 6/1999 | Knott ......................... | 416/220 R |
| 6,155,788 | A | * | 12/2000 | Beckford et al. ......... | 416/219 R |
| 6,682,306 | B2 | * | 1/2004 | Murakami et al. .......... | 416/189 |
| 6,722,847 | B2 | * | 4/2004 | Freeman et al. ........... | 415/199.4 |
| 6,764,282 | B2 | | 7/2004 | Suciu et al. | |
| 2009/0269202 | A1 | | 10/2009 | Borzakian et al. | |

FOREIGN PATENT DOCUMENTS

FR  1 143 952 A  *  3/1956
JP  2004-027854  1/2004

OTHER PUBLICATIONS

Machine Translation of FR 1143952A, retrived Jun. 29, 2010 from http://ep.espacenet.com.*
Office Action issued in co-pending U.S. Appl. No. 11/680,010, mailed Jul. 2, 2010.

* cited by examiner

*Primary Examiner* — Nathaniel Wiehe
(74) *Attorney, Agent, or Firm* — Griffin & Szipl, P.C.

(57) ABSTRACT

The invention provides a dovetail structure of a fan which attaches a fan 20 having an inlet hub diameter smaller than an outlet hub diameter to a portion around a discoid disc rotationally driven by a turbine. The disc 10 has a plurality of dovetail grooves 12 extending at a fixed angle $\theta_1$ with respect to an axis 1 of a rotation axis from a leading edge 10a to a trailing edge 10b thereof, and spaced at a fixed angle in a peripheral direction. The fan 20 has a dovetail portion 22 extending at the same angle as an angle of the dovetail groove and capable of being fitted to the dovetail groove, in an inner end thereof.

5 Claims, 7 Drawing Sheets

DOVETAIL STRUCTURE OF FAN

This application claims priority from Japanese Patent Application No. 068518/2006, filed Mar. 14, 2006, the entire disclosure of which is incorporated herein by reference.

BACKGROUND OF THE INVENTION

1. Technical Field of the Invention

The present invention relates to a turbofan engine which has a high bypass ratio and can achieve a good mileage and a low noise, and more particularly to a dovetail structure of a fan in which an inlet hub diameter is smaller than an outlet hub diameter.

2. Description of the Related Art

Figure 1:
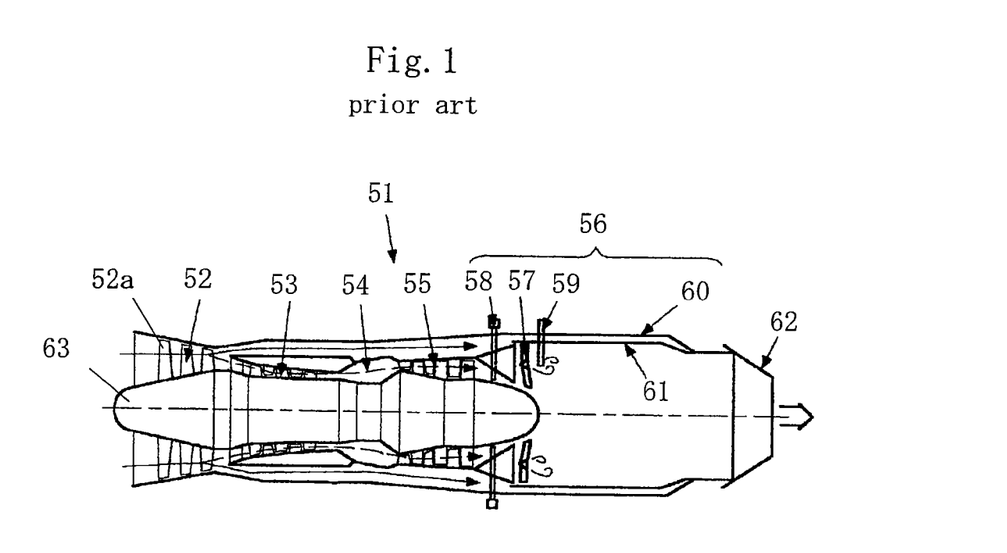
FIG. 1 is a schematic view of a conventional turbofan engine.

FIG. 1 is a schematic view of an aircraft engine 51 (a turbojet engine). As shown in this drawing, the turbojet engine is provided with a fan 52 taking in an air, a compressor 53 compressing the intake air, a burning device 54 burning a fuel by the compressed air, a turbine 55 driving the fan 52 and the compressor 53 on the basis of a combustion gas of the burning device 54, an afterburner 56 afterburning for increasing a thrust, and the like.

The afterburner 56 is constituted by a flame holder 57 having a triangular cross section or the like and forming a circulating region in a downstream side so as to achieve a flame holding, a fuel nozzle 58 for jetting out a fuel, a spark plug 59 and the like, jets out from an exhaust nozzle 62 through an inner side of a liner 61 in an inner side of an after duct 60, and increases a thrust.

In the turbojet engine mentioned above, a structure in which the fan 52 taking in the air is enlarged in size, and a bypass ratio is enlarged is called "turbofan engine". The bypass ratio corresponds to a flow ratio (bypass flow/core flow) of a bypass flow bypassing a core engine (the compressor 53, the burning device 54 and the turbine 55 mentioned above) with respect an air flow (a core flow) flowing into the core engine. The larger the bypass ratio is, the more the flow rate of the exhaust jet is reduced, so that there is obtained an effect of lowering a noise and a specific fuel consumption.

However, in the turbo engine mentioned above, if the bypass ratio is enlarged, a fan first stage rotor blade (a fan blade in the front row) and an inner diameter of a casing surrounding it become enlarged, and there is a problem that a weight of the engine is increased.

Figure 2:
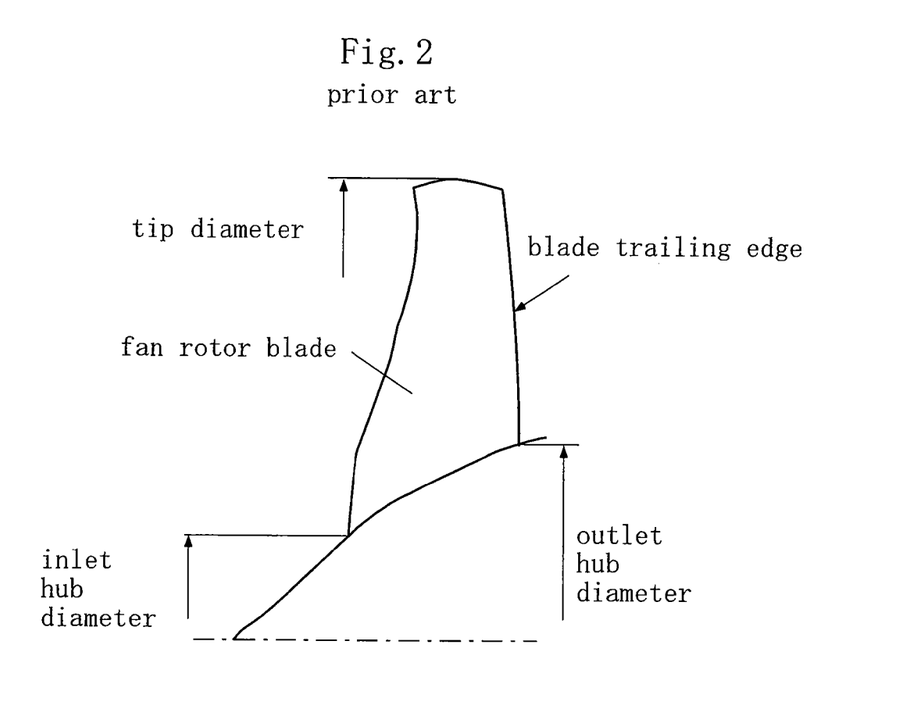
FIG. 2 is an explanatory view of a hub/tip ratio.

In other words, since a fan first stage rotor blade 52a having a structure embedded in a spinner 63 of the turbofan engine has an embedded structure, a certain degree of hub/tip ratio (inlet hub diameter/tip diameter shown in FIG. 2: normally about 0.3) is necessary, and a fan inlet area becomes narrower at an area corresponding to the inlet hub diameter.

Accordingly, if it is intended to increase the bypass ratio in order to achieve the good mileage and the low noise, the fan diameter and the inlet hub diameter become further larger, and the weight of the engine is increased.

Then, in order to solve the problem, the same applicant as that of the present invention has already proposed "turbofan engine" in patent document 1.

Figure 3:
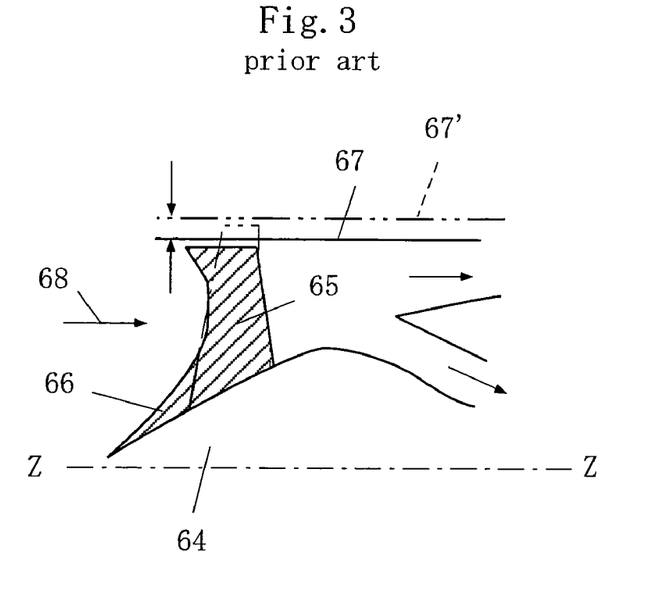
FIG. 3 is a schematic view of "turbofan engine" in patent document 1.

The turbofan engine is provided with a fan first stage rotor blade 65 for taking in an air, and a spinner 64 rotationally driving the fan first stage rotor blade, as shown in FIG. 3, and the spinner has a spiral blade 66 extending spirally to an outer side in a radial direction from an axis thereof and sucking the air from a front surface of the spinner so as to supply to the fan first stage rotor blade.

In this case, reference numerals 67 and 67' denote a casing inner diameter, and reference numeral 68 denotes an inflow air flow.

In accordance with the structure of the patent document 1, since the spinner 64 has the spiral blade 66 extending spirally to the outer side in the radial direction from the axis thereof and sucking the air from the front surface of the spinner so as to supply to the fan first stage rotor blade 65, it is possible to suck the air from the front surface of the spinner corresponding to the inlet hub diameter so as to compress the air and supply to the fan first stage rotor blade 65.

Therefore, since an entire area in the front side of the engine becomes the air inflow area of the fan first stage rotor blade 65, it is possible to make the fan diameter small, and it is possible to reduce the engine weight.

Further, since the fan first stage rotor blade 65 and the spiral blade 66 of the turbofan engine mentioned above are integrally coupled, it is possible to connect the respective blade surfaces smoothly, and it is possible to suck and compress the air efficiently. Hereinafter, the fan in which the fan first stage rotor blade 65 and the spiral blade 66 are integrally formed, the air can be sucked from the front surface of the spinner, and the substantial hub/tip ratio can be set to 0 is called as "zero hub tip ratio fan".

Patent Document 1: Japanese Unexamined Patent Publication No. 2004-27854, "TURBOFAN ENGINE"

Patent Document 2: U.S. Pat. No. 6,764,282, "BLADE FOR TURBINE ENGINE"

It is necessary to attach the fan blade of the turbofan engine to a portion around a discoid disc (or spinner) rotationally driven by a turbine. Accordingly, in conventional, there has been generally employed a dovetail structure in which a dovetail portion extending in a longitudinal direction is provided in a root portion of the fan blade, and the dovetail portion is fitted to a dovetail groove formed around the disc.

In the conventional dovetail structure mentioned above, the dovetail portion and the dovetail groove are provided in parallel to a rotation axis Z-Z of the disc, thereby preventing a centrifugal force applied to the fan blade from generating a component force in an axial direction. Hereinafter, this structure is called as "parallel dovetail structure".

However, in the case that a diameter change in an inner side of a donut-shaped flow path to which the fan blade is attached is large, if the parallel dovetail structure is employed, it is necessary to make a diameter of the dovetail portion and the dovetail groove equal to or smaller than a minimum diameter of the flow path, and there is a risk that a stress generated in the dovetail portion and the dovetail groove becomes too large.

Figure 4:
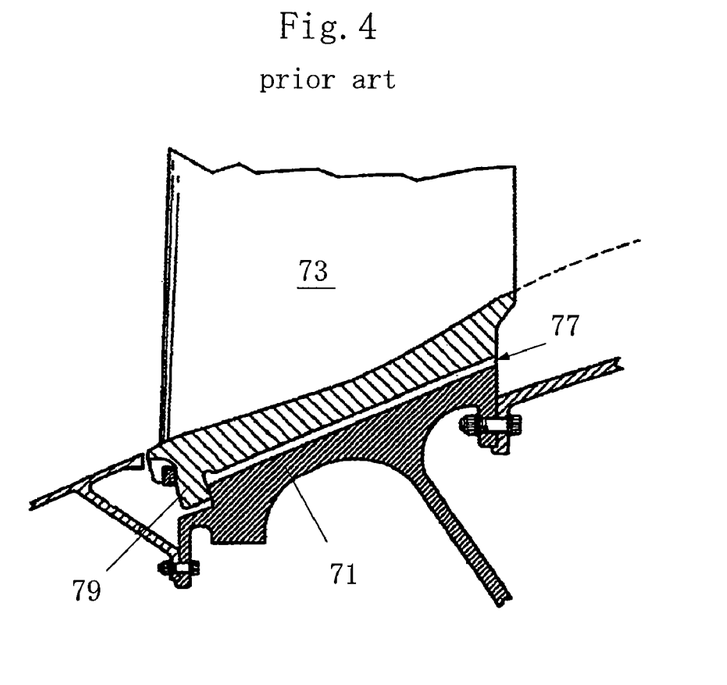
FIG. 4 is a schematic view of "slope dovetail structure" in patent document 2.

Accordingly, there has been proposed a dovetail structure in which the dovetail portion and the dovetail groove shown in FIG. 4 are sloped with respect to the rotation axis (for example, patent document 2). In this drawing, reference numeral 71 denotes a disc, reference numeral 73 denotes a blade, reference numeral 77 denotes a dovetail, and reference numeral 79 denotes a tab.

Hereinafter, this structure is called as "slope dovetail structure".

However, in the case of the zero hub tip ratio fan mentioned above, since the hub/tip ratio is between 0 and 0.35, and the diameter of the inner side of the donut-shaped flow path to which the zero hub tip ratio fan is attached is zero or close to zero, there is a problem that the parallel dovetail structure can not be essentially applied.

Further, even in the case that the slope dovetail structure is applied, it is impossible to support the centrifugal force of the front side portion (the portion corresponding to the spiral blade mentioned above) of the zero hub tip ratio fan by the disc (or the spinner).

Further, in the case that the slope dovetail structure is applied to the zero hub tip ratio fan, since the component force in the axial direction of the centrifugal force applied to the fan blade is large, there is a risk that the generated stress becomes too large in the structure having a small shear area such as the tab disclosed in the patent document 2.

SUMMARY OF THE INVENTION

The present invention is made for the purpose of solving the problems mentioned above. In other words, an object of the present invention is to provide a dovetail structure of a fan which can securely attach a fan having an inlet hub diameter smaller than an outer hub diameter to a portion around a disc rotationally driven by a turbine, and can securely support component forces in a radial direction and an axial direction of a centrifugal force applied to the fan having the inlet hub diameter smaller than the outlet hub diameter by a low stress.

In accordance with the present invention, there is provided a dovetail structure of a fan which attaches the fan having an inlet hub diameter smaller than an outlet hub diameter to a portion around a discoid disc rotationally driven by a turbine, wherein the disc has a plurality of dovetail grooves extending at a fixed angle with respect to an axis of a rotation axis from a leading edge to a trailing edge thereof, and spaced at a fixed angle in a peripheral direction, and wherein the fan has a dovetail portion extending at the same angle as an angle of the dovetail groove and capable of being fitted to the dovetail groove, in an inner end thereof.

In accordance with a preferable aspect of the present invention, the fan is constituted by a zero hub ratio fan which is capable of sucking an air close to a center of rotation, and in which a substantial inlet hub diameter is zero or close to zero, and a hub/tip ratio is between 0 and 0.35.

Further, the dovetail portion of the fan is constituted by a main dovetail portion extending to the trailing edge from an intermediate portion and capable of being fitted to the dovetail groove, and an sub dovetail portion extending to the intermediate portion from the leading edge, and a spin cone capable of being fixed to the disc is provided in a front side of the fan, and the spin cone has a plurality of sub dovetail grooves fitted to a plurality of sub dovetail portions in an inner peripheral portion thereof.

Further, the structure is preferably made such that the main dovetail portion has a taper side portion having a fixed slope in which a width in a peripheral direction is narrower in a rear side than in a front side, and the dovetail groove has a taper grove side portion fitted to the taper side portion of the main dovetail portion.

Further, the structure is preferably made such that the main dovetail portion has a taper bottom portion having a fixed slope in which a bottom surface in a radial direction is shallower in a rear side than in a front side, and the dovetail groove has a taper grove bottom portion fitted to the taper side portion of the main dovetail portion.

Further, the structure is preferably made such that a platform portion constituting an inner peripheral surface of an air flow path of the fan has a taper side portion having a fixed slope in which a width in a peripheral direction is narrower in a rear side than in a front side, the disc has a taper projection portion fitted to the taper side portion.

Further, the structure is preferably made such that the dovetail portion of the fan has a vertical rear surface which is orthogonal to the dovetail groove in a rear end thereof, the dovetail structure has a rear retainer fixed to a rear end surface of the disc and closely attached to the vertical rear surface so as to prevent the vertical rear surface from moving rearward.

In accordance with the structure of the present invention mentioned above, since the disc has the dovetail groove extending at the fixed angle with respect to the axis of the rotation axis from the leading edge to the trailing edge, and the fan having the inlet hub diameter smaller than the outlet hub diameter has the dovetail portion extending at the same angle as the angle of the dovetail groove and capable of being fitted to the dovetail groove, it is possible to securely attach the fan to the portion around the disc, and it is possible to securely transmit the centrifugal force applied to the fan to the disc via the dovetail portion and the dovetail groove.

Further, since the dovetail portion and the dovetail groove extend at the fixed angle with respect to the axis of the rotation axis, it is possible to set a sufficient long dovetail groove even in the case of attaching the fan having the inlet hub diameter smaller than the outlet hub diameter, and it is possible to sufficiently suppress the stress generated in the dovetail portion and the dovetail groove.

Further, on the basis of the structure in which the dovetail portion of the fan is constituted by the main dovetail portion and the sub dovetail portion, the spin cone capable of being fixed to the disc is provided in the front side of the fan, and the sub dovetail portion is supported by the sub dovetail groove of the spin cone, it is possible to securely support the centrifugal force applied to the portion having the small hub diameter of the fan in which the inlet hub diameter is smaller than the outlet hub diameter so as to securely transmit to the disc.

Further, since the taper receiving surface corresponding to the dovetail groove of the disc is provided by setting the width in the peripheral direction of the main dovetail portion, the bottom surface in the radial direction of the main dovetail portion, or the width in the peripheral direction of the platform portion to the taper shape having the fixed slope, it is possible to securely support the component force along the dovetail groove of the centrifugal force applied to the fan having the inlet hub diameter smaller than the output hub diameter by the low stress caused by the wide area.

Further, on the basis of the structure in which the vertical rear surface orthogonal to the dovetail groove is provided in the rear end of the dovetail portion of the fan, and the rear retainer fixed to the rear end surface of the disc is closely attached to the vertical rear surface thereof, it is possible to lower an internal stress generated in the rear retainer.

The other objects and advantageous features of the present invention will be apparent from the following description with reference to the accompanying drawings.

DESCRIPTION OF THE PREFERRED EMBODIMENTS

A description will be given below of a preferable embodiment in accordance with the present invention with reference to the accompanying drawings. In this case, in each of the drawings, the same reference numerals are attached to a common portion, and an overlapping description will be omitted.

Figure 10:
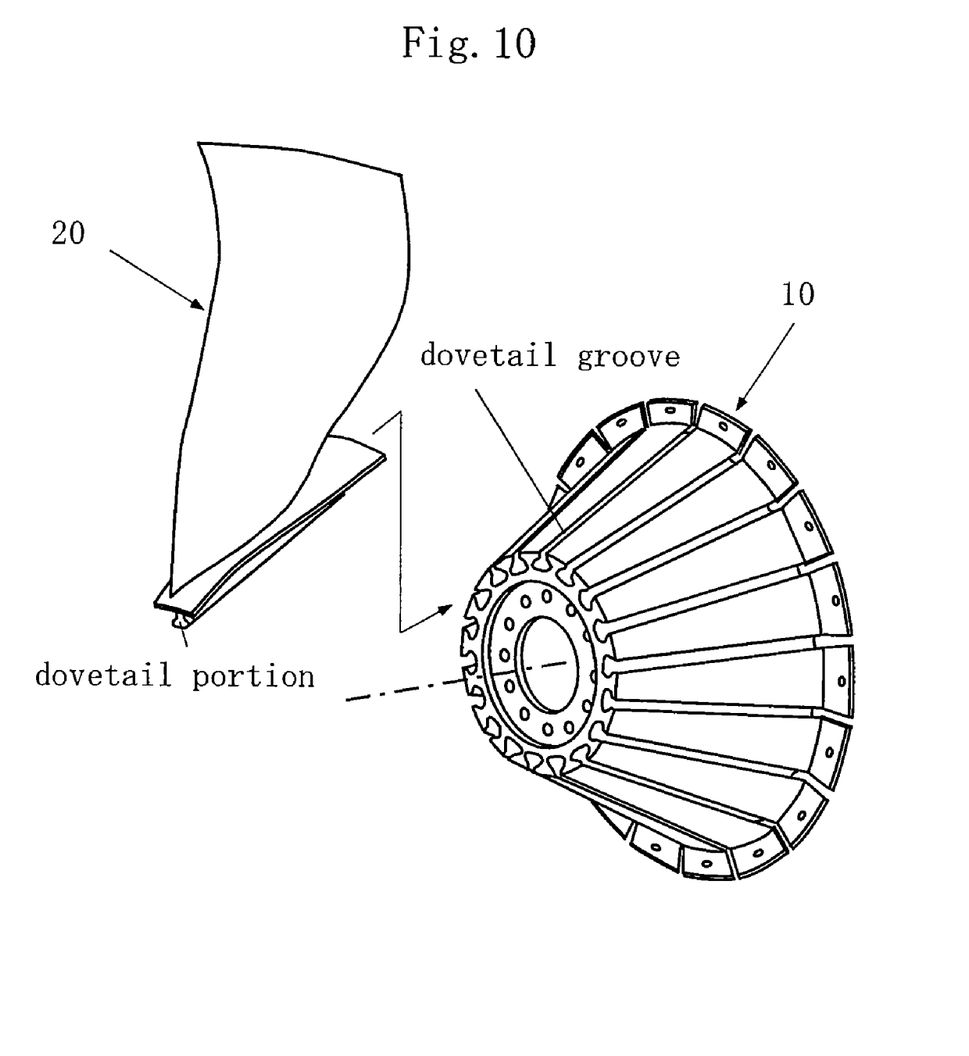
FIG. 10 is a perspective view showing a fan and a disc in a separating manner.

FIG. 10 is a schematic view showing a fan and a disc in a separating manner, and schematically shows a fitting structure.

A dovetail structure in accordance with the present invention is structured such that a dovetail portion of a fan 20 is attached to a dovetail groove provided around a disc 10 rotationally driven by a turbine (not shown).

Figure 5:
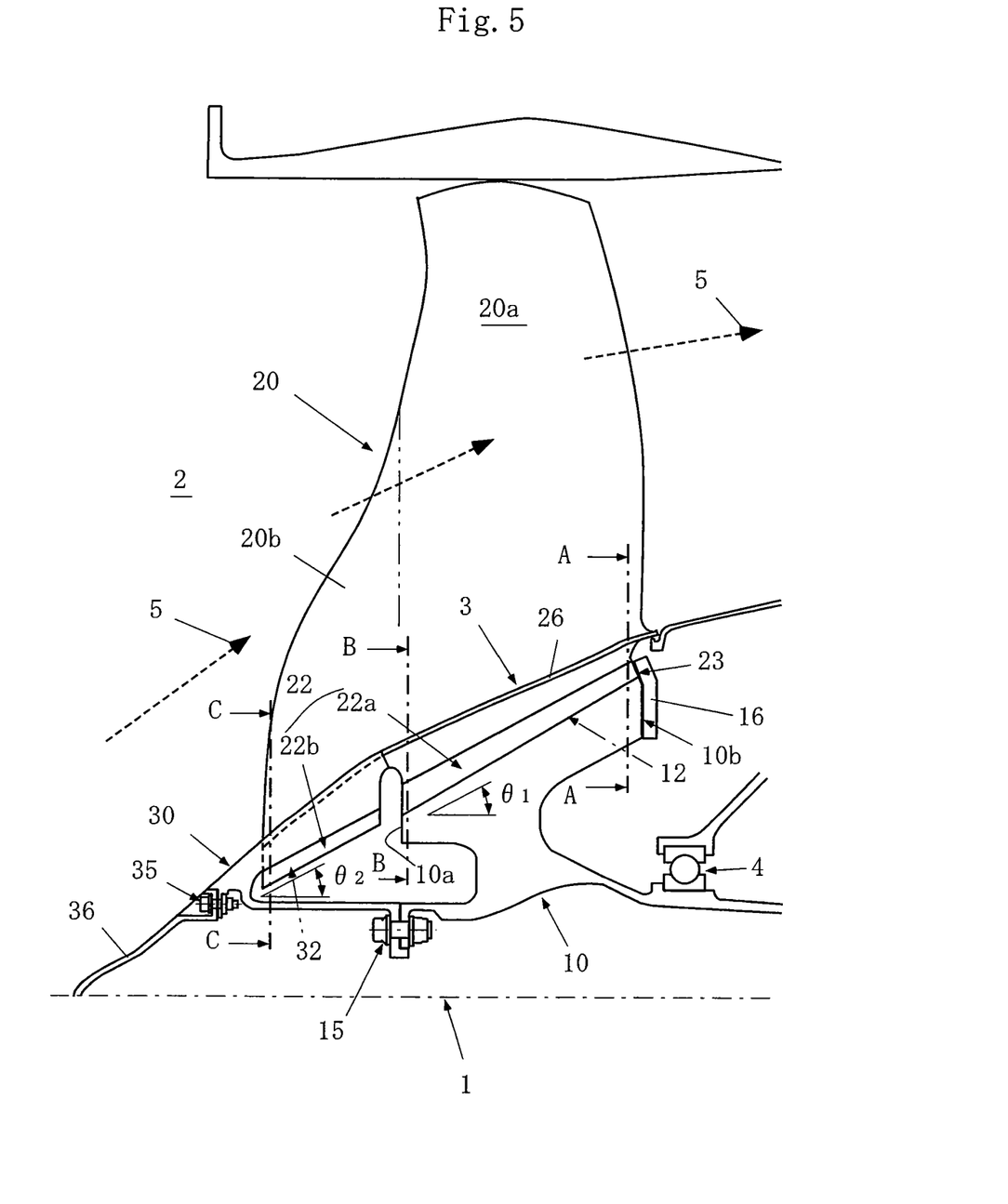
FIG. 5 is a transverse cross sectional view of a fan provided with a dovetail structure in accordance with the present invention.

FIG. 5 is a transverse cross sectional view of a fan provided with a dovetail structure in accordance with the present invention, and shows only an upper side of an axis 1 of a rotating shaft.

Figure 6:
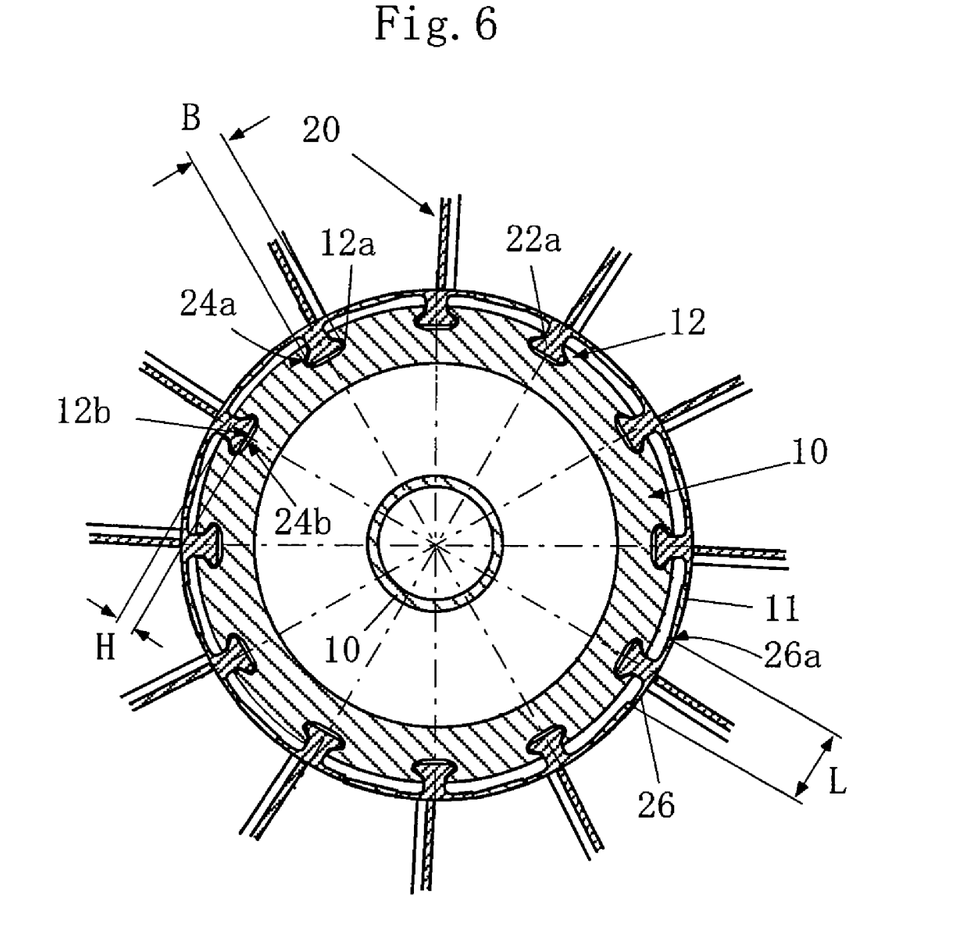
FIG. 6 is a cross sectional view along a line A-A in FIG. 5.
Figure 7:
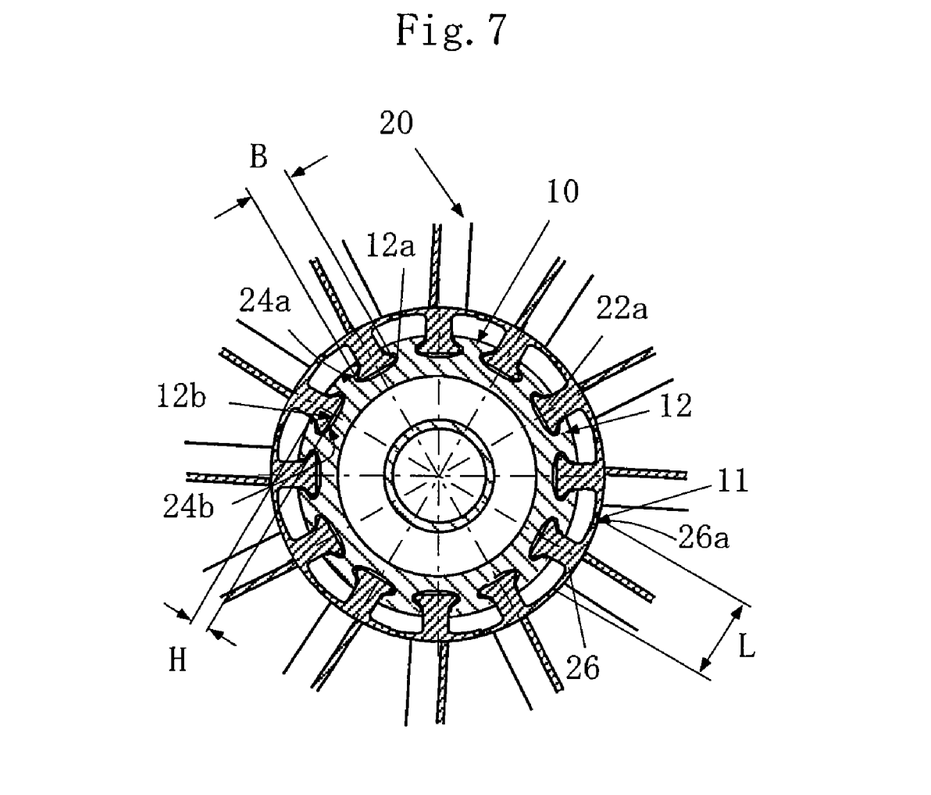
FIG. 7 is a cross sectional view along a line B-B in FIG. 5.
Figure 8:
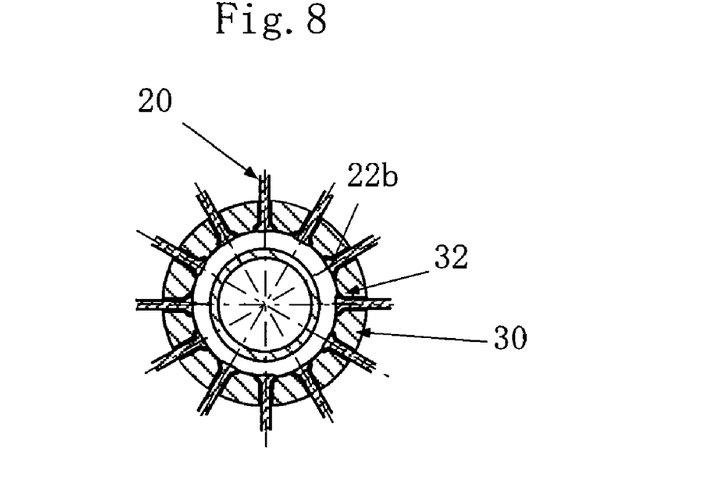
FIG. 8 is a cross sectional view along a line C-C in FIG. 5.

Further, FIG. 6 is a cross sectional view along a line A-A in FIG. 5, FIG. 7 is a cross sectional view along a line B-B in FIG. 5, and FIG. 5 is a cross sectional view along a line C-C in FIG. 8.

Further, in this embodiment, the fan 20 is constituted by a zero hub tip ratio fan which can suck an air close to a center of rotation, and in which a substantial inlet hub diameter is zero or close to zero, and a hub/tip ratio is between 0 and 0.35.

In this case, in FIG. 5, reference numeral 1 denotes an axis of a rotating shaft of a disc 10 and the zero hub tip ratio fan 20, reference numeral 2 denotes an air flow path, reference numeral 3 denotes an inner peripheral surface of the air flow path, reference numeral 4 denotes a bearing rotatably supporting the disc 10, and reference numeral 5 denotes a flow of an inflow air.

The zero hub tip ratio fan 20 is formed such that a fan first stage rotor blade 20a for taking in the air and a spiral blade 20b sucking the air from the portion close to the center of rotation so as to compress and supply to the fan first stage rotor blade are integrally coupled, and respective blade surfaces are smoothly connected. In this case, the substantial hub/tip ratio of the zero hub tip ratio fan 20 is not 0, but can be set to 0.

In FIGS. 5 and 6, the disc 10 has a plurality of (for example, twelve in this embodiment) dovetail grooves 12 which are at a distance of a fixed angle (for example, 30 degree in this embodiment) in a peripheral direction. Further, the dovetail groove 12 extends at a fixed angle $\theta_1$ with respect to the axis 1 of the rotating shaft from a leading edge 10a of the disc 10 to a trailing edge 10b.

The fixed angle $\theta_1$ corresponds to an angle in which a forward side is close to the axis 1 and a rearward side is away from the axis 1, and preferably corresponds to an angle along the inner peripheral surface 3 of the air flow path 2. In this case, the angle $\theta_1$ is about 30 degree in this embodiment.

The zero hub tip ratio fan 20 has a dovetail portion 22 in an inward end thereof. The dovetail portion 22 extends at the same angle $\theta_1$ as the angle of the dovetail groove 12 of the disc 10, and is structured such as to be capable of being fitted to the dovetail groove 12.

In FIG. 5, the dovetail portion 22 of the zero hub tip ratio fan 20 is constituted by a main dovetail portion 22a extending to the trailing edge from the intermediate portion and capable of being directly fitted to the dovetail groove 12, and an sub dovetail portion 22b extending to the intermediate portion from the leading edge. It is preferable that the main dovetail portion 22a is provided at a position corresponding to the fan first stage rotor blade 20a, and the sub dovetail portion 22b is provided at a position corresponding to the spiral blade 20b.

The angle $\theta_2$ of the sub dovetail portion 22b with respect to the axis 1 of the rotating shaft preferably extends at the same angle $\theta_1$ as that of the main dovetail portion 22a.

However, the present invention is not limited to this, but the angle $\theta_2$ may be set to a different angle from the angle $\theta_1$. Further, the angle $\theta_2$ of the sub dovetail portion 22b is not essential, but may be structured such as to be in parallel to the axis 1 of the rotating shaft.

In FIG. 5, the dovetail structure in accordance with the present invention is further provided with a spin cone 30 which can be fixed to the disc 10 by a coupling bracket 15, in a forward side (a left side in the drawing) of the zero hub tip ratio fan 20.

The spin cone 30 has a plurality of (for example, twelve in this embodiment) sub dovetail grooves 32 fitted to a plurality of dovetail portions 22b, in an inner peripheral portion thereof. The sub dovetail grooves 32 are provided at positions in a peripheral direction in correspondence to the dovetail grooves 12 so as to be spaced at a distance of a fixed angle (for example, 30 degree in this embodiment).

In this embodiment, the spin cone 30 further has a cone head 36 attached to a leading end thereof by a coupling bracket 35.

In the case of the zero hub tip ratio fan 20 in which the substantial inlet hub diameter is zero or close to zero, a flow path diameter of the inner peripheral surface 3 of the air flow path 2 is largely changed from zero or a small diameter close to zero to a large diameter reaching three times or more (about three times in this embodiment) thereof. Accordingly, a diameter of a mounting portion of the sub dovetail portion 22b becomes equal to or less than one third of the maximum diameter of the mounting portion of the main dovetail portion 22a.

Further, the centrifugal force applied to the sub dovetail portion 22b corresponds to a centrifugal force applied to the spiral blade 20b positioned in an outer side thereof, and is smaller in comparison with a centrifugal force of the fan first stage rotor blade 20a applied to the main dovetail portion 22a.

Accordingly, it is preferable that a size of the sub dovetail portion 22b is set to be sufficiently smaller than a size of the main dovetail portion 22a.

In accordance with the structure mentioned above, since the disc 10 has the dovetail groove 12 extending at the fixed angle $\theta_1$ with respect to the axis 1 of the rotating shaft from the leading edge 10a to the trailing edge 10b, and the zero hub tip ratio fan 20 has the dovetail portion 22 (the main dovetail portion 22a) extending at the same angle $\theta_1$ as the angle of the dovetail groove 12 and capable of being fitted to the dovetail groove, it is possible to securely attach the zero hub tip ratio fan 20 to the portion around the disc 10, and it is possible to securely transmit the centrifugal force applied to the zero hub tip ratio fan 20 to the disc 10 via the dovetail portion (the main dovetail portion 22a) and the dovetail groove 12.

Further, since the dovetail portion 22 and the dovetail groove 12 extend at the fixed angle with respect to the axis 1 of the rotating shaft, it is possible to set the sufficiently long dovetail groove 12 even in the case of attaching the zero hub tip ratio fan in which the substantial inlet hub diameter is zero or close to zero, and it is possible to suppress the stress generated in the dovetail portion and the dovetail groove sufficiently small.

Further, in accordance with the structure in which the dovetail portion 22 of the zero hub tip ratio fan 20 is constituted by the main dovetail portion 22a and the sub dovetail portion 22b, the spin cone 30 capable of being fixed to the disc 10 is provided in the forward side of the zero hub tip ratio fan 22, and the sub dovetail portion 22b is supported by the sub dovetail groove 32 of the spin cone, it is possible to support the centrifugal force applied to the portion in which the hub diameter of the zero hub tip ratio fan 20 is zero or close to zero via the spin cone 30 so as to securely transmit it to the disc 10.

In FIG. 5, in the dovetail structure in accordance with the present invention, the dovetail portion 22 (the main dovetail portion 22a in this embodiment) of the zero hub tip ratio fan 20 further has a vertical rear surface 23 which is orthogonal to the dovetail groove 12, in a rearward end thereof.

Further, the dovetail structure in accordance with the present invention has a rear retainer 16 fixed to a rear end surface (a rear edge 10b) of the disc 10 by a coupling bracket (for example, a bolt and a nut) (not shown).

A part of the rear retainer 16 is bent along the vertical rear surface 23, and a front surface thereof is closely attached to the vertical rear surface 23 so as to prevent the main dovetail portion 22a from moving backward.

In accordance with this structure, in comparison with the case that the rear surface of the main dovetail portion 22a is set to the surface which is orthogonal to the axis 1 of the rotating shaft, it is possible to make a surface pressure of a contact surface substantially constant, and it is possible to reduce the internal stress generated in the rear retainer.

Figure 9A:
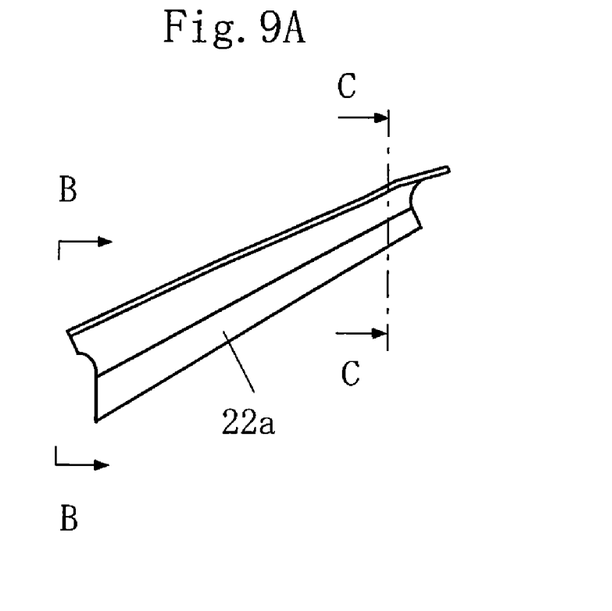
FIGS. 9A, 9B and 9C are schematic views of a main dovetail portion.
Figure 9B:
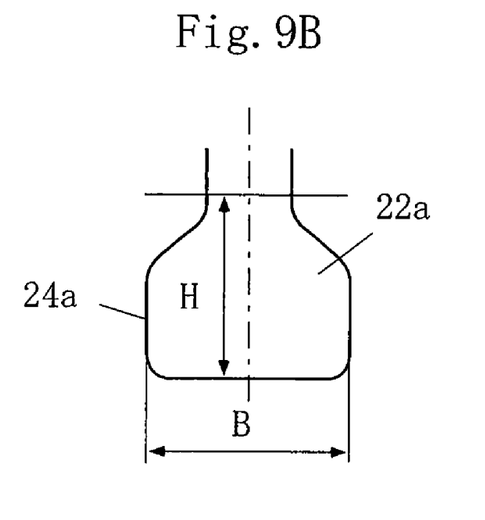
Figure 9C:
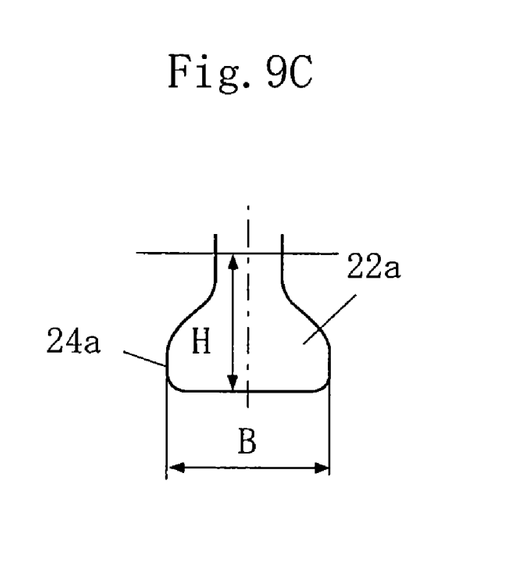

FIG. 9A is a side elevational view of the main dovetail portion, FIG. 9B is a view as seen from an arrow B-B of FIG. 9A, and FIG. 9C is a cross sectional view along a line C-C.

In FIGS. 6, 7, 9A, 9B and 9C, the main dovetail portion 22a has a taper side portion 24a having a fixed slope in which a width B in a peripheral direction is narrower in a rearward side (FIG. 6) than in a forward side (FIG. 7). Further, the dovetail groove 12 has a taper groove side portion 12a fitted to the taper side portion 24a of the main dovetail portion 22a.

In accordance with this structure, since the taper side portion 24a and the taper groove side portion 12a are in contact at a wedge-shaped wide area, and a component force F along the dovetail groove 12 of the centrifugal force applied to the zero hub tip ratio fan 20 is dispersed to a compression force in the peripheral direction of the disc 10, it is possible to securely support the component force F of the centrifugal force by a low stress by the wide area.

Further, in FIGS. 6, 7, 9A, 9B and 9C, the main dovetail portion 22a has a taper bottom portion 24b having a fixed slope in which a bottom surface (a depth H) in a radial direction is shallower in the rearward side (FIG. 6) than in the forward side (FIG. 7). Further, the dovetail groove 12 has a taper groove bottom portion 12b fitted to the taper bottom portion 24b of the main dovetail portion 22a.

In accordance with this structure, since the taper bottom portion 24b and the taper groove bottom portion 12b are in contact at the wedge-shaped wide area, and the component force F along the dovetail groove 12 of the centrifugal force applied to the zero hub tip ratio fan 20 is dispersed to the force in the radial direction of the disc 10, it is possible to securely support the component force F of the centrifugal force by the low stress caused by the wide area.

Further, in FIGS. 6 and 7, a platform portion 26 constituting the inner peripheral surface 3 of the air flow path 2 of the zero hub tip ratio fan 20 has a taper side portion 26a having a fixed slope in which a width L in a peripheral direction is narrower in the rearward side (FIG. 6) than in the forward side (FIG. 7). Further, the disc 10 has a taper projection portion 11 fitted to the taper side portion 26a. It is preferable that the taper projection portion 11 is integrally formed with the disc 10.

In accordance with this structure, since the taper side portion 26a and the taper projection portion 11 are in contact at the wedge-shaped wide area, and the component force F along the dovetail groove 12 of the centrifugal force applied to the zero hub tip ratio fan 20 is dispersed to the compression force in the peripheral direction of the disc 10, it is possible to securely support the component force F of the centrifugal force by the low stress caused by the wide area.

In this case, all of the vertical rear surface 23 and the rear retainer 16, the taper side portion 24a and the taper groove side portion 12a, the taper bottom portion 24b and the taper groove bottom portion 12b, and the taper side portion 26a and the taper projection portion 11 are not essential, but it is possible to securely support the component force F of the centrifugal force by the low stress caused by the wide area, on the basis of any means, or a combination of some.

In this case, it goes without saying that the present invention is not limited to the embodiment mentioned above, but can be variously modified in a range within the scope of the present invention.

The invention claimed is:

1. A dovetail structure of a fan that attaches the fan to a portion around a discoid disc rotationally driven by a turbine, wherein the fan has an inlet hub diameter smaller than an outlet hub diameter,
    wherein the disc has a plurality of dovetail grooves extending, at a fixed first angle with respect to an axis of a rotation, from a leading edge to a trailing edge of the disc, and spaced at a fixed second angle in a peripheral direction, and
    wherein the fan has a dovetail portion extending at the same angle as the first angle of the dovetail grooves and the dovetail portion is fittable to the dovetail groove, in an inner end of the fan,
    wherein the dovetail portion of the fan comprises:
    (a) a main dovetail portion extending to a trailing edge of the fan from an intermediate portion and the main dovetail portion is fittable to the dovetail groove of the disc: and
    (b) a plurality of sub dovetail portions extending to the intermediate portion from a leading edge of the fan;
    wherein the dovetail structure further comprises a spin cone fixable to the disc, wherein the spin cone is disposed on a front side of the fan, and the spin cone has a plurality of sub dovetail grooves fitted to the plurality of sub dovetail portions in an inner peripheral portion of the spin cone, wherein a platform portion comprising an inner peripheral surface of an air flow path of the fan has a first taper side portion having a fixed slope in which a width or the first taper side portion, in a peripheral direction, is narrower on a rear side of the fan than on the front side of the fan, and wherein the disc has a taper projection portion fitted to the first taper side portion.

2. The dovetail structure of the fan as claimed in claim 1, wherein the fan is a zero hub ratio fan that is capable of sucking air close to a center of rotation, and wherein the inlet hub diameter of the fan is zero or close to zero, and a hub/tip ratio of the fan is between 0 and 0.35.

3. The dovetail structure of the fan as claimed in claim 1, wherein the main dovetail portion has a second taper side portion having a fixed slope in which a width, in a peripheral direction, is narrower in the rear side of the fan than on the front side of the fan, and the dovetail groove has a taper grove side portion fitted to the second taper side portion of the main dovetail portion.

4. The dovetail structure of the fan as claimed in claim 1, wherein the main dovetail portion has a taper bottom portion having a fixed slope in which a bottom surface, in a radial direction, is shallower on the rear side of the fan than on the front side of the fan, and the dovetail groove of the disc has a taper grove bottom portion fitted to a taper bottom portion of the main dovetail portion.

5. The dovetail structure of the fan as claimed in claim 1, wherein the dovetail portion of the fan has a vertical rear surface that is orthogonal to the dovetail groove in a rear end of dovetail portion, and the dovetail structure has a rear retainer fixed to a rear end surface of the disc, and the rear retainer is closely attached to the vertical rear surface so as to prevent the vertical rear surface from moving rearward.

* * * * *